Patented Oct. 28, 1941

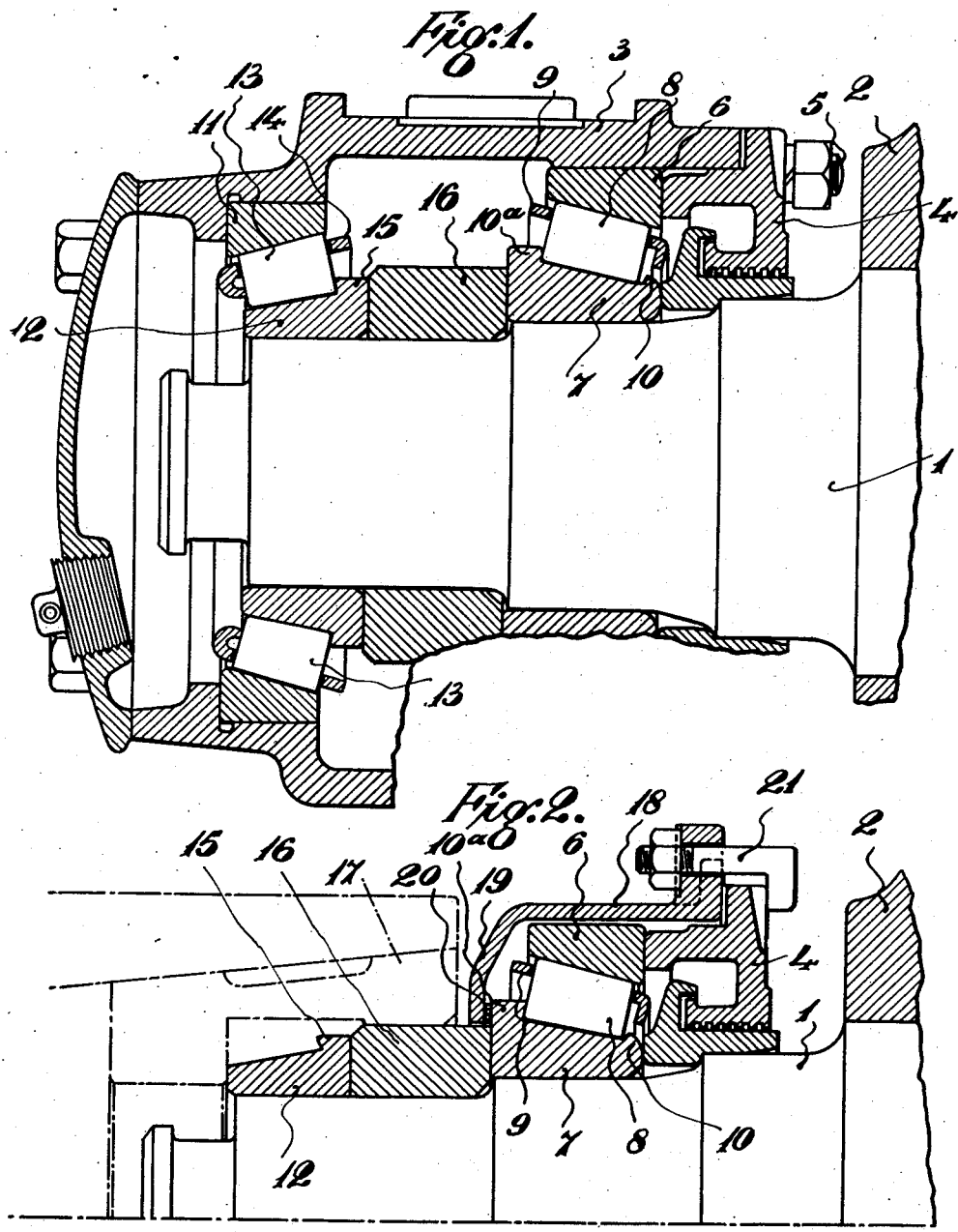

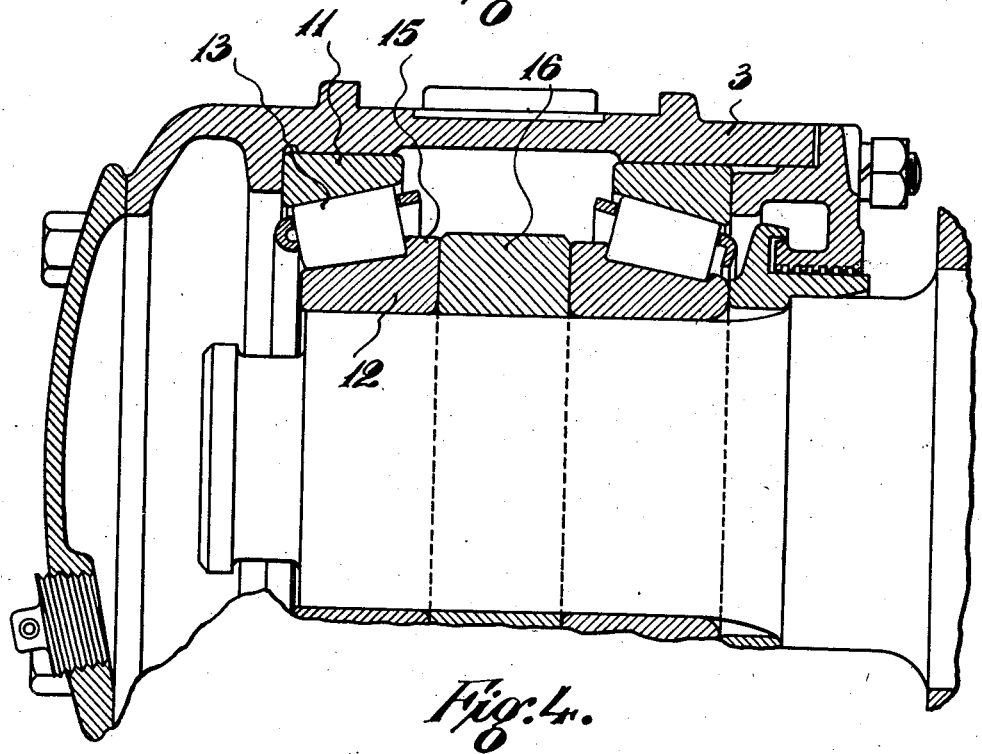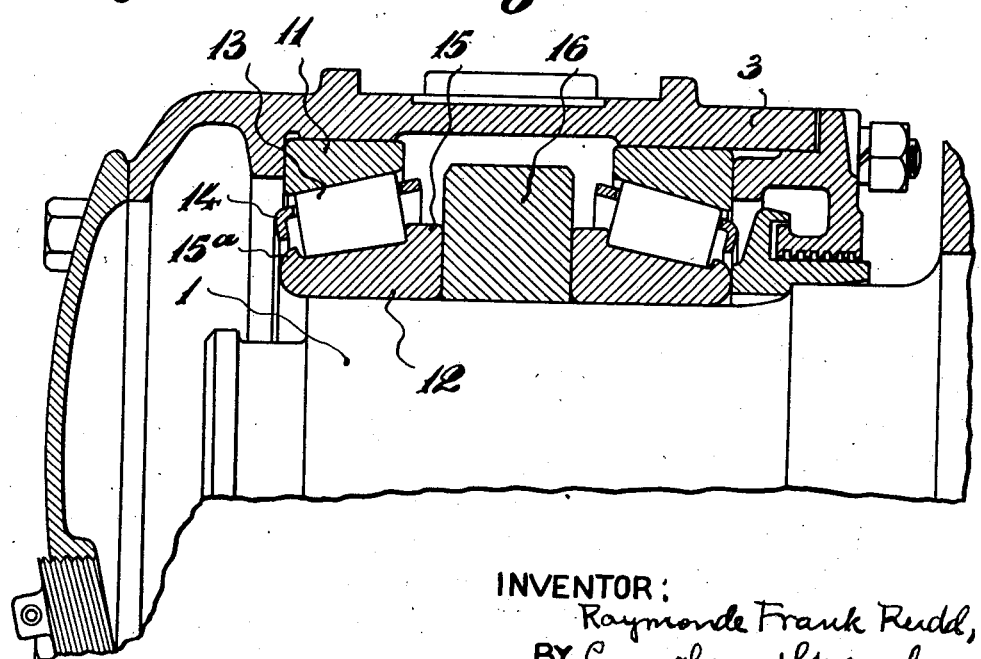

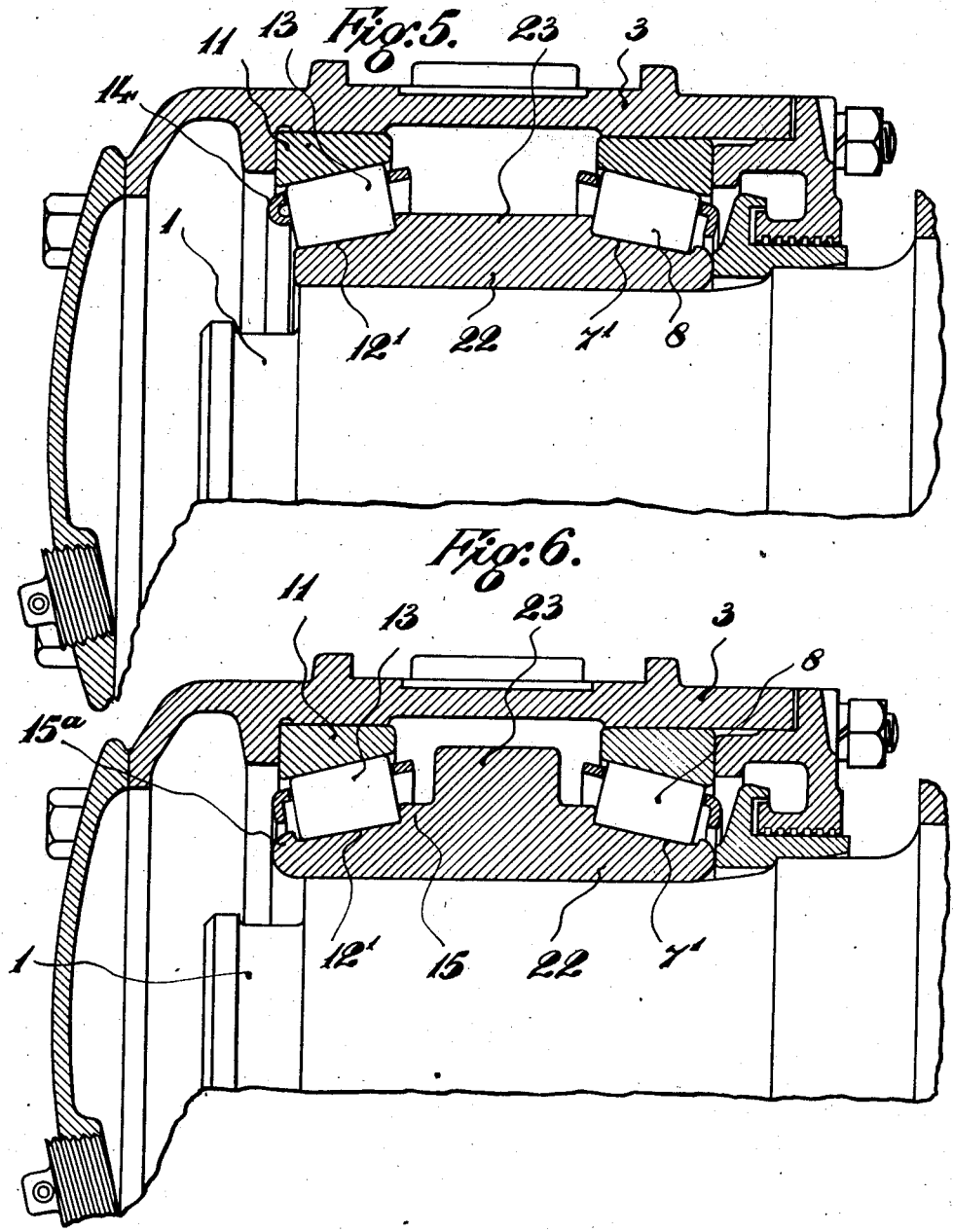

2,260,955

UNITED STATES PATENT OFFICE 2,260,955

AXLE-BOX AND OTHER BEARING MOUNTINGS

Raymonde Frank Rudd, Aston, Birmingham, England, assignor to The Timken Roller Bearing Company, Canton, Ohio, a corporation of Ohio Application July 31, 1941, Serial No. 404,764
In Great Britain March 28, 1941

10 Claims. (Cl. 308—180)

This invention relates to axle-box and other bearing mountings of the kind comprising an axle-box casing or bearing housing removably mounted upon an axle or shaft through the medium of two axially-spaced roller bearings the rollers of which run upon race surfaces provided either upon separate inner race cones or bearing members, or upon a single double-track inner bearing member, said inner bearing member or members having a press or interference fit upon an axle or shaft carrying a wheel or other part that may require from time to time to be treated in a lathe or similar machine, such as for tire-turning (in the case of a railway-vehicle wheel), re-grinding or the like, and the outer cup or race of the outermost bearing (that is, the bearing at the end of the mounting remote from the wheel or other part on the axle or shaft), being removable (either with or without the rollers at that end) as well as the axle-box casing or bearing housing being removable.

The object of the present invention is to provide an axle-box or other bearing mounting, of the kind referred to, having means permitting of the wheel or other part on the axle or shaft being mounted and driven in a collet lathe or similar machine, for tire-turning or other treatment, without the necessity of stripping the inner bearing member or members from the axle or shaft, and ensuring the axle or shaft being gripped by the chuck at a point comparatively close to the wheel or other part to be treated, this being desirable to withstand the heavy cuts taken when tire-turning.

According to the invention, an axle-box or other bearing mounting, of the kind referred to, is provided upon the axle or shaft, between the inner races of the two bearings, with a fixed ring, flange or collar having a diameter not less than that of a circle circumscribing the highest point or points of any parts of the outermost bearing remaining on the axle or shaft when the axle casing or housing, with the bearing cup or outer race of the said outermost bearing, and any other readily removable parts, are removed, so that the said ring, flange or collar can be received within and be gripped by a collet or like chuck of a lathe or similar machine and thereby the axle or shaft supported and centered whilst it is rotated. Thus, the said ring, flange or collar may be of a diameter such as to project outwards beyond and clear of any parts of the outermost bearing remaining on the axle or shaft when the readily removable parts have been removed.

The said fixed ring, flange or collar may be a separate member fixed directly upon the axle or shaft between two separate inner bearing members, or it may be fixed to or integral with a single dual-track inner bearing member, being located between the race tracks thereof.

The rollers and cage of the outermost bearing may be readily detachable, in which case the ring, flange or collar can have any diameter not less than that of the highest part of the inner race member of the said outer bearing; or the rollers and cage of the outer bearing may be non-removable, so as to remain on the axle or shaft, in which case the diameter of the ring, flange or collar must be slightly larger than the diameter of a circle circumscribing the highest parts of the rollers.

Figure 1 of the accompanying drawings is a longitudinal section through an axle-box mounting in accordance with one form of the present invention.

Figure 2 shows the axle supported and held in a lathe collet, for turning the wheel tire, after the axle-box casing and the outer bearing cup and rollers have been removed.

Figures 3 to 6 are sectional views showing modifications.

Referring to Figures 1 and 2 of the said drawings, the railway axle-box mounting therein shown comprises axle 1 carried by the vehicle wheel 2 and enclosed within an axle-box casing 3 supported upon the said axle by two axially-spaced taper-roller bearings, the casing 3 being held in place by a rear cover-plate 4 secured to the casing by studs or bolts 5. The innermost bearing comprises an outer member or cup 6, an inner member or cone 7 having a press or interference fit on the axle, and taper rollers 8, held by a cage 9, interposed between the said cup 6 and cone 7, the latter having ribs 10, 10ª, at both ends so that the rollers are not readily removable therefrom. The outermost bearing comprises an outer member or cup 11, an inner member or cone 12 having a press or interference fit on the axle, and taper rollers 13, held by a cage 14, interposed between the said cup 11 and cone 12. The rollers 13 have their smaller ends directed towards the outer end of the axle-box, and the cone 12 has no outer retaining rib but a thrust rib 15 at one end only, namely, at its inner or highest end, so that the cup 11 and the rollers 13 with their cage, can be removed endwise off the smaller end of the cone, leaving the latter fixed on the axle.

According to the present invention, secured upon the axle 1 by a press or interference fit is a separate ring, flange or collar 16 located between the inner cones 7, 12, its diameter being rather greater than that of the highest part of the rib 15 on the cone 12, so that it projects outwards clear of said rib.

When it is desired to re-turn the tire of wheel 2 in a lathe, the axle-box casing 3 is first removed after detaching the rear cover-plate 4, and the cup 11 and rollers 13 (with their cage) of the outermost bearing, are also removed, leaving the cone 12 fast upon the axle and the innermost bearing also intact. The axle can then be mounted in a lathe by an endwise movement, so that the ring, flange or collar 16 can enter and be gripped by the lathe collet chuck 17 as shown in Figure 2. The wheel is rotated by any suitable driving means, such as by a driving device engaging the spokes, and the collet 16 serves to support and center the axle during the turning operation. During this process the bearings are preferably protected from dirt or foreign material by means of a cover 18 having an inturned end part 19 engaged with the cone 7 through a pad 20, and provided at the opposite end with hook-bolts 21 engaged over the rear cover-plate 4.

In the mounting represented in Figure 1, the outermost bearing is smaller than the innermost bearing, the loading on the respective bearings being in inverse ratio to their distances from the load centre line. The diameter of the central ring 16 can therefore be kept down to a minimum.

As shown in Figure 3, however, both bearings may be of equal size, the ring 16 being of a diameter slightly larger than the outer cone 12 which has only one rib 15 so that the rollers 13 can be removed. Apart from the relative size of the bearings and of the ring 16, the mounting is the same as that shown in Figure 1.

In the modification shown in Figure 4, the cone 12 of the outermost bearing is provided with ribs 15, 15$^a$, at both ends, the outer rib 15$^a$ being a retaining rib and the rib 15 being a thrust rib, so that the rollers 13 and cage 14 cannot be removed after the axle casing 3 and cup 11 have been detached. They thus remain on the cone 12 fixed on the axle 1, so that it is necessary to make the central ring 16 of a diameter larger than that of the circle circumscribing the highest part of the rollers 13 in order that the end of the axle may be inserted endwise into the lathe collet and the ring 16 enclosed and gripped thereby.

In Figure 5 the invention is shown applied to a bearing in which the inner race tracks 7$^1$, 12$^1$, for the rollers 8, 13, of the innermost and outermost bearings, are provided upon the ends of a single inner bearing sleeve or member 22, of double conical form, which is a press fit on the axle 1. In this case the race 12$^1$ is not provided with a rib at the outer end, so that the rollers 13 and their cage 14 can be removed from the race, and the central portion of the bearing sleeve 22 is provided with an integral ring, flange or collar 23 projecting outwards of the tracks 7$^1$, 12$^1$ and the ends of which constitute thrust ribs for the rollers 8, 13. When the casing 3, cup 11, and rollers 13 have been removed, the said ring, flange or collar 23 can be inserted endwise into and be gripped by the lathe collet.

Figure 6 also shows the invention applied to a bearing having a single inner bearing sleeve 22 secured on the axle 1, with conical raceways 7$^1$, 12$^1$, at opposite ends for the rollers 8, 13, but in this case the outermost raceway 12$^1$ has a retaining rib 15$^a$ at its outer end as well as a thrust rib 15 at its inner end, so that the rollers 13 cannot be removed, only the cup 11 being detachable after the casing 3 has been removed. The sleeve 22 is provided, between the two bearings, with a central integral ring, flange or collar 23 the diameter of which is slightly greater than that of a circle circumscribing the top portions of the rollers 13, so that when the casing 3 and cup 11 have been removed, the said ring, flange or collar 23 can be inserted endwise into and be gripped by the lathe collet.

I claim:

1. A bearing mounting comprising an axle or shaft carrying a member that may require to be treated in a lathe or similar machine, two axially-spaced roller bearings consisting of rollers supported upon inner race parts upon the axle or shaft and engaged by outer bearing members of which that member appertaining to the outermost bearing of the mounting is removable, a removable bearing housing supported upon the two roller bearings, and a fixed collar provided upon the axle or shaft between the inner race parts, said collar having a diameter not less than that of a circle circumscribing the highest point of any part of the outermost bearing remaining on the axle or shaft when the housing and outer bearing member of the outermost bearing and other readily removable parts are removed, so that the collar can be received within and be gripped by a collet or like chuck of a lathe or similar machine.

2. An axle-box bearing mounting comprising an axle; a wheel thereon; two axially-spaced roller bearings each consisting of an inner race part press-fitted upon the axle, a row of bearing rollers and an outer bearing member, the said outer bearing member of the outermost bearing being removable endwise from the rollers and axle; an axle casing supported upon the two rollers bearings but being endwise removable therefrom and from the axle; and a fixed collar provided upon the axle between the inner race parts, said collar having a diameter not less than that of a circle circumscribing the highest point of any part of the outermost bearing remaining on the axle when the axle casing and outer bearing member of the outermost bearing and other readily removable parts are removed, so that the collar can be received within and be gripped by a collet or like chuck of a lathe or similar machine.

3. A bearing mounting comprising an axle or shaft carrying a wheel, two axially-spaced roller bearings consisting of rollers supported upon inner race parts upon the axle or shaft and engaged by outer bearing members of which that member appertaining to the outermost bearing which is remote from the wheel is removable endwise from the rollers and axle or shaft, a removable bearing housing supported upo nthe two roller bearings, and a collar fixed upon the axle or shaft between the two inner race parts, said collar being of a diameter such as to project outwards beyond and clear of any parts of the outermost bearing remaining on the axle or shaft when the housing and removable outer bearing member and other readily removable parts have been removed, so that the collar can be received within and be gripped by a collet or like chuck of a lathe or similar machine.

4. An axle-box and axle assembly comprising an axle; a wheel thereon; two axially-spaced inner bearing parts fixed on the axle outwards of the wheel; two sets of bearing rollers on the respective inner bearing parts; outer bearing cups on the respective sets of rollers, the cup which is remote from the wheel being removable endwise from the rollers and axle; an axle casing supported upon the outer bearing cups and removable endwise from the axle; and a fixed collar provided upon the axle between the inner bearing parts, said collar being of a diameter such that it projects outwards beyond and clear of any parts of the outermost bearing remaining on the axle when the axle casing and removable outer bearing cup and other readily removable parts have been removed, so that the collar can be received within and be gripped by a collet or like chuck of a lathe or similar machine.

5. A bearing mounting comprising an axle or shaft carrying a wheel, a pair of spaced roller bearings consisting of two rows of rollers supported on two separate inner bearing members fixed on the axle or shaft outwards of the wheel and engaged by outer bearing members of which that member which is remote from the wheel is removable endwise from the axle or shaft, a removable bearing housing supported upon the two roller bearings, and a separate collar fixed directly upon the axle or shaft between the two separate inner bearing members, said collar being of a diameter such that it projects outwards beyond and clear of any parts of the outermost bearing remaining on the axle or shaft when the housing and removable outer bearing member and any other readily removable parts have been removed, so that the collar can be received and be gripped by a collet or like chuck of a lathe or similar machine.

6. A bearing mounting comprising an axle or shaft carrying a wheel; a pair of spaced roller bearings consisting of two rows of caged rollers supported on inner bearing parts fixed on the axle or shaft outwards of the wheel and engaged by outer bearing members, the outer bearing member of the outermost bearing being removable endwise from the axle or shaft and the inner bearing part of said outermost bearing having a thrust rib at the inner end only but no rib at the outer end so that the rollers are removable endwise therefrom; a removable bearing housing supported upon the two roller bearings, and a fixed collar provided on the axle or shaft between the inner bearing parts, said collar having a diameter not less than the diameter of the said thrust rib on the inner bearing part of the outermost bearing.

7. An axle-box and axle assembly comprising an axle; a wheel thereon; a pair of spaced bearing cones fixed on the axle outwards of the wheel, the outermost cone having a thrust rib at the inner end but no rib at the outer end; taper bearing rollers on the cones, cages for the two sets of rollers the outermost set and their cage being removable endwise from the outermost cone; outer bearing cups on the respective sets of rollers, the outermost cup being removable endwise from the axle; an axle casing supported upon the outer bearing cups and removable endwise from the axle; and a collar fixed directly upon the axle between the two inner bearing cones, said collar having a diameter such that it projects outwards beyond and clear of the thrust rib on the outermost inner bearing cone.

8. A bearing mounting comprising an axle or shaft carrying a wheel; a pair of spaced taper roller bearings including inner coned race parts fixed on the axle or shaft each having an outer retaining rib and a thrust rib at the inner end, caged rollers non-removable from said race parts, and outer cups the outermost of which is removable endwise from the rollers and axle or shaft; a bearing housing supported upon the outer cups and removable endwise from the axle or shaft; and a fixed collar provided upon the axle or shaft between the inner race parts, said collar being of a diameter greater than that of a circle circumscribing the highest points of the rollers of the outermost bearing.

9. An axle-box and axle assembly comprising an axle, a wheel thereon, an axle casing surrounding and removable from the end portion of the axle outwards of the wheel, a pair of axially-spaced bearing cones fixed on said end portion of the axle within the casing each having a thrust rib at the inner and larger end and a retaining rub at the outer and smaller end, sets of taper bearing rollers on the respective cones, cages for the rollers, outer bearing cups mounted on the rollers and supporting the axle casing, the outermost cup being removable endwise from the rollers and axle, and a collar fixed directly upon the axle between the two cones, said collar having a diameter greater than that of a circle circumscribing the highest points of the outermost set of rollers.

10. An axle-box and axle assembly comprising an axle, a wheel thereon, an axle casing surrounding and removable from the end portion of the axle outwards from the wheel, a single dual-track inner bearing member fixed upon the said end portion of the axle and having at opposite ends two conical race surfaces with thrust ribs at their inner and larger ends, taper rollers on the said two race surfaces, cages for the two sets of rollers, outer bearing cups mounted on the rollers and supporting the axle casing, the outermost cup being removable endwise from the axle, and a collar integral with the inner bearing member, said collar having a diameter not less than that of a circle circumscribing the highest point of any part of the outermost bearing remaining on the axle when the axle casing and outermost cup and any other readily removable parts are removed.

RAYMONDE FRANK RUDD.